United States Patent [19]

Wolf

[11] Patent Number: 4,889,303
[45] Date of Patent: Dec. 26, 1989

[54] FLEXIBLE ARM RETAINER DEVICE

[76] Inventor: Mitchell E. Wolf, 2450 S. 3200 West #4, West Valley City, Utah 84119

[21] Appl. No.: 211,367

[22] Filed: Jun. 24, 1988

[51] Int. Cl.$^4$ ............................................. F16M 13/00
[52] U.S. Cl. ...................................... 248/160; 248/159
[58] Field of Search ................ 248/160; 439/591, 592, 439/593

[56] References Cited

U.S. PATENT DOCUMENTS

| | | | |
|---|---|---|---|
| 2,392,447 | 1/1946 | Archer | 248/160 |
| 3,168,274 | 2/1965 | Street | 248/160 |
| 3,277,292 | 10/1966 | Horan | 248/160 X |
| 3,335,989 | 8/1967 | Bachmann | 248/160 |
| 3,875,720 | 4/1975 | Russell | 248/160 X |
| 3,913,518 | 10/1975 | Kaplan | 248/160 X |
| 4,609,247 | 9/1986 | Annoot | 439/591 |

FOREIGN PATENT DOCUMENTS

| | | | |
|---|---|---|---|
| 1129314 | 9/1956 | France | 248/160 |
| 640672 | 6/1962 | Italy | 248/160 |
| 537417 | 6/1941 | United Kingdom | 248/160 |
| 2177788 | 1/1987 | United Kingdom | 248/160 |

Primary Examiner—Ramon S. Britts
Assistant Examiner—David G. Kolman
Attorney, Agent, or Firm—Trask, Britt & Rosa

[57] ABSTRACT

A retainer arm for use in supporting an object above a base member is disclosed. The retainer arm may include a smooth walled tubular elongate housing which defines a hollow channel in the interior thereof. A metal core formed by one or more strands is housed within the channel. An end section is mounted on each of the opposing ends of the housing, thereby compacting the metal wire within the housing. The core and shaft are manually bendable but of sufficient rigidity to retain the configuration imparted thereto by the bending while also supporting an object mounted on an end of that arm.

7 Claims, 4 Drawing Sheets

FLEXIBLE ARM RETAINER DEVICE

FIELD

This invention relates to retaining arms, particularly those used to hold objects e.g. microphones, musical instruments and lights, in a stationary position.

1. Statement of the Art

Various stands or supports adapted for supporting an object in a preselected orientation and location are known. In many environments, such as the music industry, these stands are utilized to support objects, e.g. microphones, lights, and musical instruments such as cymbals in a preselected position. These support stands are often used by a plurality of users whose physical attributes e.g. height, are disparate. For example, a microphone mounted to a podium or other standing support must be positioned in proximity of the speaker's mouth for effective operation. Depending on the height of the speaker, the microphone must be raised or lowered to accommodate the speaker and thereby position the microphone in an optimal position to receive the speaker's voice. Oftentimes, it is necessary to provide not only an adjustability in the height of microphone, but further, to provide three dimensional adjustability. There exists, therefore, a need for support stands which can be made adjustable to accommodate the particular individualized requirements of any given user.

The conventional approach to providing an adjustable support has included the use of a metal conduit support arm constructed from a plurality of individual segments. These segments are mounted one to another in a seriatim manner to form an elongate member. Each pair of contiguous segments are adapted for mechanical cooperation one with another to facilitate a degree of movement of the segments relative to each other. Notwithstanding that this conventional approach has provided retaining arms which are adjustable to support an object in various preselected orientations, difficulties have arisen in their use in the musical industry environment. Specifically, the adjustment of these retaining arms often creates noise as the various individual segments move in relation to each other. When the object being held is a microphone, oftentimes the microphone will pick up the noise, amplify it and thereafter transmit to those in the audience served by the microphone system. Not only can this noise be distracting but furthermore, the pitch or decibel level of the noise produced by the segment interactions may be such that the amplified noise can be extremely uncomfortable to a listener.

Due to the use and structure of the individualized segment construction, the prior retaining arms are often considerably limited in the extent of their movement and adjustability capabilities.

The use of the prior retaining arms has created problems for those users which have long hair or textured clothing. Often, the structure of the individualized arm segments or the connection structure of the various contiguous segments is such that long hair or clothing which brushes over the retaining arm is caught and held fast. Understandably, this condition is hazardous to the user.

There exists a need for a support retaining arm which not only provides a means of adjustably retaining an object in a preselected position but furthermore, avoids the difficulties found in those structures of the conventional art.

SUMMARY OF THE INVENTION

An adjustable retaining arm having a smooth-walled, flexible tubular housing and at least one flexible, bendable core element contained within that housing is disclosed.

The housing defines a hollow channel therein which extends along the length of the housing. The housing may have a solid, smooth exterior surface fabricated of a flexible material such as polyvinyl chloride, nylon or other synthetic material. The housing provides a smooth exterior which limits the possibility of a user's hair or clothing being entangled with the retaining arm.

A metal core which may be formed by one or a plurality of metal strands is positioned within the channel defined by the housing. Each strand or wire is fabricated from a metal or other material which is sufficiently flexible that it may be manually bent into a desired configuration. Though being manually bendable, the strand or strands exhibit sufficient stiffness that the strand(s) retains the configuration imparted to it by bending. Further, the strand(s) is sufficiently rigid to retain that configuration notwithstanding being loaded by the attachment thereto of an object to be supported. A plurality of the strands within the housing may be formed of a metal suited for transmitting electrical current, e.g. copper. These particular strands may be insulated e.g. by a rubber or plastic coating, whereby the retaining arm includes a means of conveying electrical current through the interior of the arm and along the length of the arm.

An end connection section may be positioned on an end of the housing. This end section may be adapted for connection and electrical current conduction to an object to be supported. For example, the end section may be fitted with male or female threads adapted for mechanical and/or electrical cooperation with an object.

Each end section may include a distribution structure means adapted for distributing the weight of the object being supported over a length of the housing and metal core. This structure may be interposed between the opposing ends of an end section. Structure may include a series of annularly configured, like members which are spacedly arranged along and mounted to an elongate inner member. Each ring-like member is connected to an adjacent ring-like member by a bridge or linking member. The outermost ring-like members are linked to an adjacent end section by a plurality of bridge members. The structure defines a grid-like structure having a plurality of openings therein which permit some measure of flexibility within the end section. As the end section is loaded by the attachment of an object thereto, the end section flexes or bends somewhat over the length of the distribution structure. In a preferred construction, the end of the housing is mounted within the end section proximate to the distribution structure. Resultingly, the weight of the supported object is transmitted over a length of the housing by a somewhat flexible distribution structure. This configuration provides for a distribution of the loading which avoids concentration of the loading on a spatially narrow region of the housing.

DETAILED DESCRIPTION OF THE DRAWINGS

Figure 1:
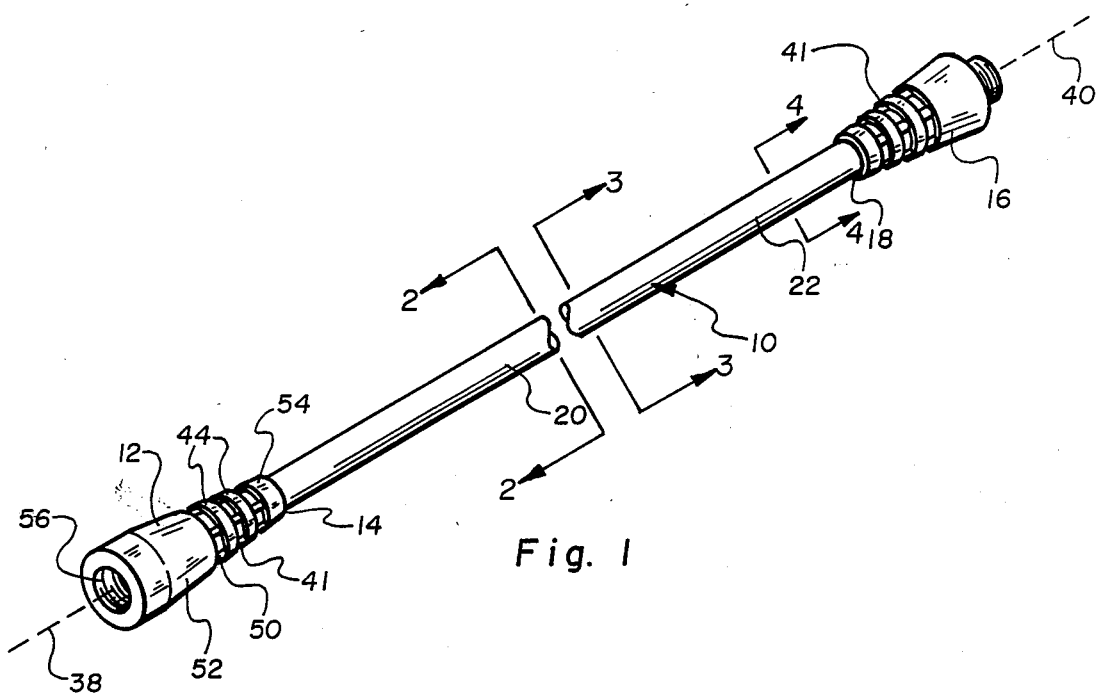
FIG. 1 is an elevated perspective view of a flexible retainer arm of this invention.

The embodiment of the invention illustrated in FIGS. 1-4 includes an elongate flexible shaft 10 having a female connection member 12 mounted on its first end 14. A male connection member 16 is mounted on the shaft's opposing second end 18.

The shaft 10 includes an elongate, tubular housing 20. The housing 20 has a generally annular cross-sectioned sidewall 22 which may maintain a constant diameter over the length of the housing 20. The sidewall 22 defines a circular cross-sectioned elongate hollow channel 24 which extends along the length of the housing 20. Both the housing 20 and channel 24 may have a right cylindrical appearance. In preferred embodiments the housing 20 is fabricated from a flexible bendable material such as rubber or synthetic plastic compounds, such as polyvinyl chloride.

Positioned within channel 24 is a plurality of elongate, cylindrical wire members 26. As shown, the wires 26 may have a circular cross-section. Each of the wires extend through the length of the channel 24 and are abutted against the two connection members 12 and 16 which are mounted on the opposing ends 14 and 18 of the housing 20. The wire members 26 may be considered as being compacted within the channel 24 by the end connection members 12 and 16.

The wire members 26 are formed typically of metal and more specifically metals having some degree of flexibility and bendability, e.g. aluminum, copper, mild, soft steel, and annealed metals. Preferably, the thickness of the wires together with their material composition is such that the total wire assembly is suitable for bending manually by the user. Other materials besides metals may be used to make up the core in place of the metal wires. For example, some of the metal wires may be removed and a synthetic plastic injected into the space formerly occupied by the removed wires. In other embodiments, materials having the required bendability characteristics and stiffness, e.g. synthetic plastics, may be substituted for all of the wires.

Figure 4:
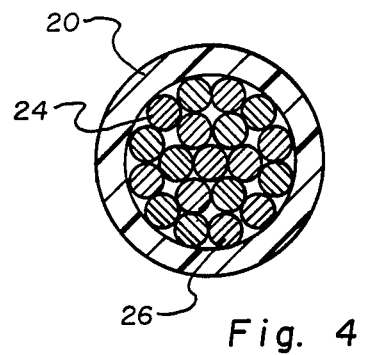
FIG. 4 is a partial cross-sectional view of the retainer arm of FIG. 1 taken along sectional lines 4—4.

The degree of flexibility and bendability of the shaft 10 may be varied by modifying the number and dimensions of the wire members 26 positioned within the channel 24. Alternatively, wires composed of metals having various flexibility characteristics may be positioned within the channel so as to obtain the desired flexibility and bendability characteristics. As illustrated in FIG. 4, a typical shaft 10 may have nineteen wire members, i.e. strands, 26 positioned within channel 24.

Connection member 12, which may likewise be fabricated of a rubber or synthetic material, e.g. nylon or polyvinyl chloride, includes a first section 30 and a second section 32. First section 30 has an exterior appearance which approximates a truncated cone. Section 30 has a sidewall 34 which defines a cylindrical hollow channel 36 therein. Channel 36 includes a longitudinal axis 38 which may be oriented collinear with the longitudinal axis 40 of shaft 10. The end 14 of shaft 10 is inserted into and retained within channel 36. The connection member 12 may be mounted or secured to shaft 10 i.e. tubular member 20 and wire strands 26, by an interference fit, adhesive fit, pressure fit, molded fit, or other means known in the art.

Figure 11:
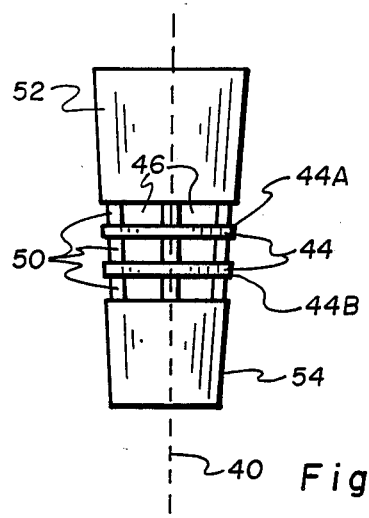
FIG. 11 is a side elevational view of an end section of the retainer arm.

The exterior surface 39 of the section 30 may be configured to provide a stress relief region 41. As shown in FIG. 1 and 11, region 41 may include a plurality of annular members 44, oriented parallel to one another along the axis 38. The members 44 are mounted to a plurality of longitudinally extending, bridging support members 50. The bridging members connect each of the pairs of annular members by extending therebetween.

Further, each of the outermost annular members 44A and 44B is mounted to a bridging support member 50 which links those members to opposing end segments 52 and 54 of the section 30.

Figure 2:
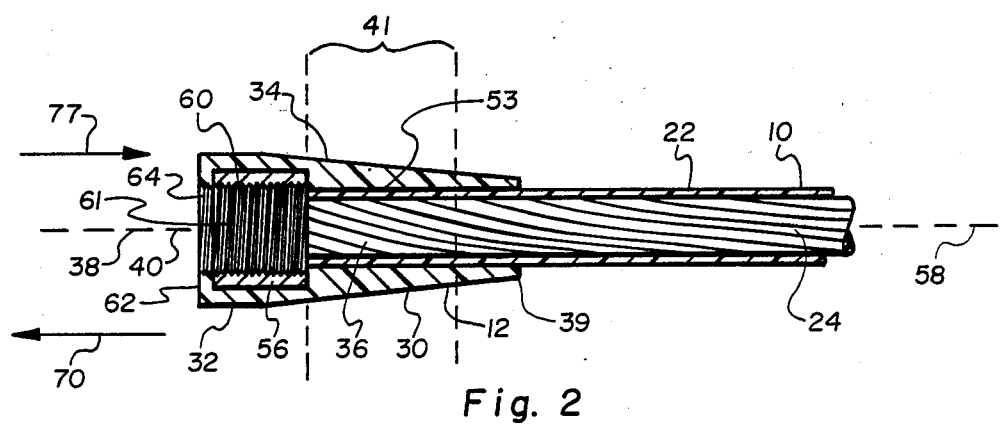
FIG. 2 is a cross-sectional view of an end section of the retainer arm of FIG. 1 taken along sectional lines 22, the stress relieving structure having been removed for clarity.
Figure 3:
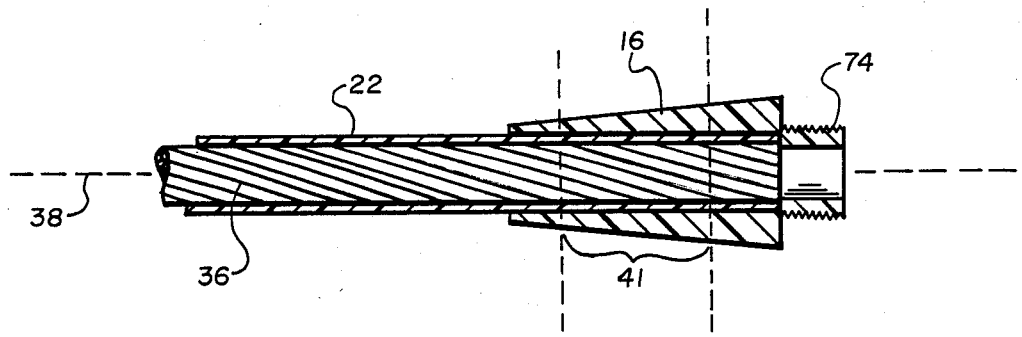
FIG. 3 is a cross-sectional view of an end section of the retainer arm of FIG. 1 taken along sectional lines 33, the stress relieving structure having been removed for clarity.

As shown in FIG. 2, the end 53 of the shaft 10 is mounted within channel 36 such that it is contained within that region 41 (identified by dotted lines) of the end section 12. This positioning ensures that the loading of the weight of the object secured to the end 62 of section 12 is incrementally transferred to the shaft 10 over the length of the shaft positioned within the region 41.

Section 32 of the connection member 12 has a generally cylindrical exterior configuration.

Section 32 defines a generally cylindrical open-ended channel 56 therein. As shown in FIG. 2, channel 56 has a longitudinal axis 58 which is collinear with the longitudinal axis 38 of the connection member 12. Positioned within the channel 56 is an annular shaped threaded socket 60. Socket 60 defines a threaded recess well 61 adapted to threadedly receive and retain an object to be supported e.g. a microphone of a light socket. In preferred embodiments the socket 60 is manufactured from metal, e.g. aluminum so as to ensure a long operation life. It should be understood that the configuration of the recess well 61 may be modified with various other retaining apparatus adapted to retain an object, e.g. clips, brackets, adhesives.

As shown in FIG. 2, the socket 60 is positioned with section 32 such that it does not form the end 62 of the section 32. Instead, section 32 includes an annularly shaped end region 64 which is integral with the body of section 32. This end region 64 operates to retain the socket 60 within the channel 56 by opposing any forces on the socket 60 directed in the direction indicated by arrow 70. Such force applications would be anticipated due to the threaded insertions and retractions of an object into and out of the socket 60. Force applications to the socket 60 directed in the direction indicated by arrow 77 are opposed by the body of the section 32 which surrounds and abuts against socket 60. As shown in FIG. 2, the end section 12 circumscribes the socket 60.

The structure of end section 16 is similar to that previously described for section 12 with the exception that the open-ended, female threaded channel 56 is replaced by an outwardly extending male threaded member 74.

Each of the end sections 12 and 16 is adapted for connection to an object to be supported, a second connection member or a base member. Recognizably, various support arms may be joined one to another, i.e. by intercooperating sections 12 and 16 of two arms to form a retaining arm of greater length. Further, one of the end sections may be connected to a base member for support purposes.

Figures 5, 6:
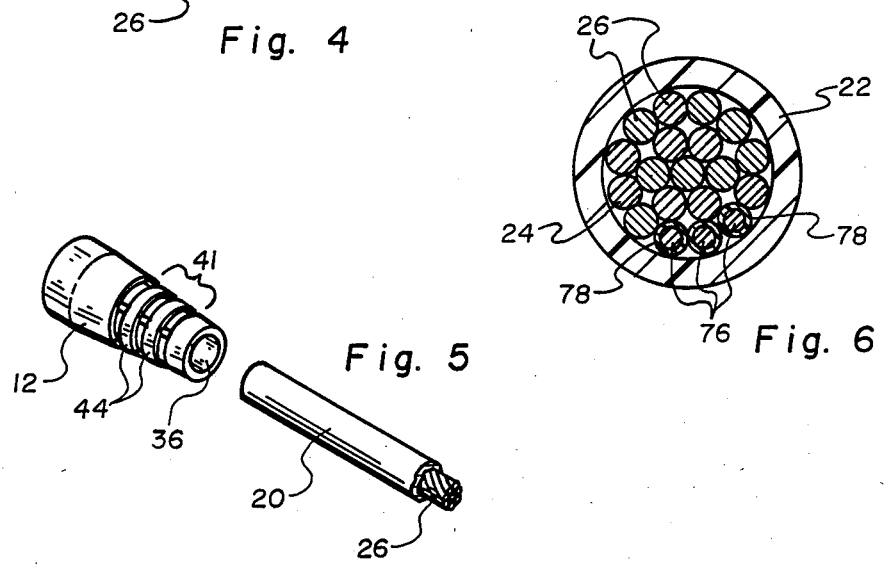
FIG. 5 is an exploded view of an end section of a flexible retainer arm.
FIG. 6 is a cross-sectional view of a modified retainer arm.

FIG. 6 illustrated a modification of the shaft as shown in FIG. 4. Three of the metal strands generally 76 are surrounded by a jacket or insulation 78. Each of the strands 76 are fabricated of a metal suitable for transmitting electrical current. The jacket or insulation 78 is fabricated of a non-conductor of electricity and thereby insulates its respective strand from the receiving strands. The strands 76 extend along the entire length of the shaft 10 and in contrast with the remaining strands 26, strands 76 extend into the end sections 12 and 16 sufficiently to permit their electrical connection with either the object to be supported on an electrical cord 81 mounted on the end of the shaft 10. The three strands 76 provide a positive, negative and a ground wire for the transmission of electrical power.

Figure 7:
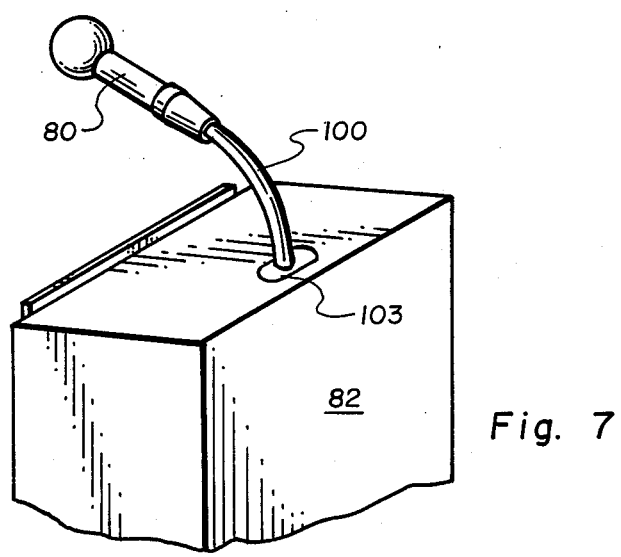
FIG. 7 is an elevated perspective view of a retainer arm of the invention in use as a microphone support.

FIGS. 7-10 illustrate some of the many uses of the instant retaining arm. FIG. 7 illustrates the arm in use as a support for a microphone 80. The microphone is retained within the end section 12. The shaft 10 is mounted to a podium 82 by a bracket or end section 84. The retaining arm illustrated in FIG. 7 includes a plurality of electrical strands 76 as illustrated in FIG. 6 and thereby provides a structure wherein the electrical wires are hidden from view.

Figure 8:
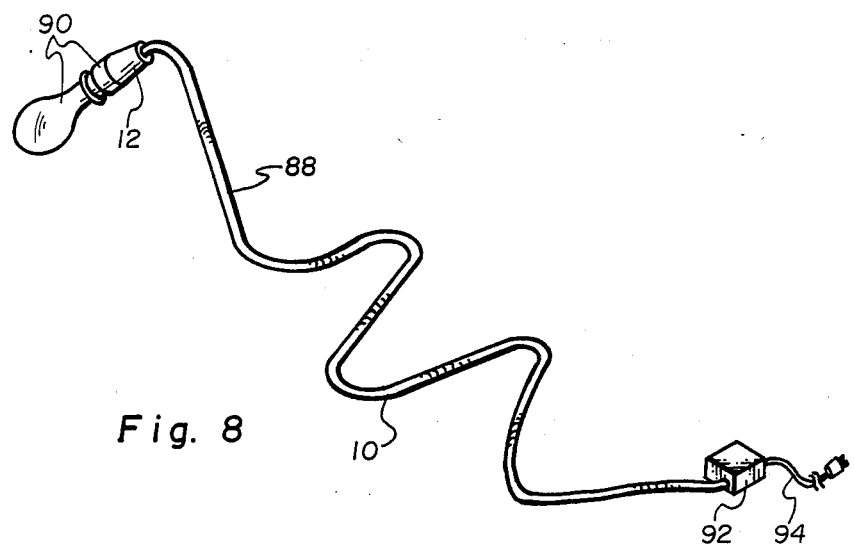
FIG. 8 is an elevated perspective view of a first embodiment of a retainer arm of the invention in use as a light support.
Figures 12, 13:
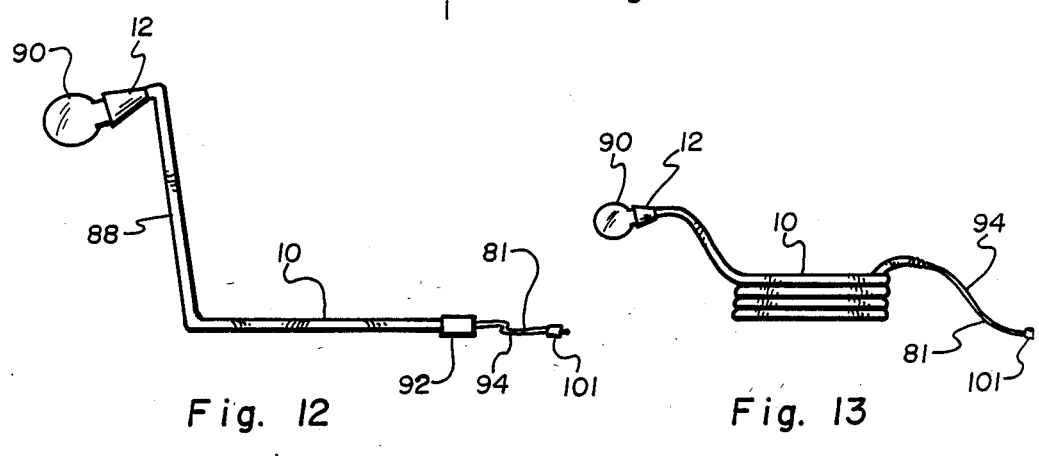
FIG. 12 is a side view of the embodiment shown in FIG. 8.
FIG. 13 is a side view of the embodiment shown in FIG. 9.

FIGS. 8 and 12 illustrate a shaft 10 which has been configured into a sinuous orientation suited for forming a base for supporting an upstanding portion of that shaft 88 on which is mounted a light bulb/socket arrangement 90. The socket for the bulb is retained within end section 32. The end section 16 has been configured as an electrical switch box 92 having a plug fitted electrical cord 94 mounted thereto. Similar to the embodiment shown in FIG. 7, electrical wires 76 are housed within shaft 10 and extend along the length thereof.

Figure 9:
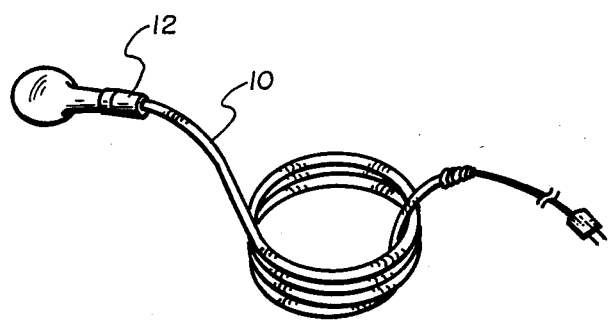
FIG. 9 is an elevated perspective view of a second embodiment of a retainer arm of the invention in use as a light support.

FIG. 9 and 13 illustrate a modification of the structure shown in FIG. 8 wherein the shaft 10 has been configured into a series of generally circular arcs which are arranged one atop another.

Figure 10:
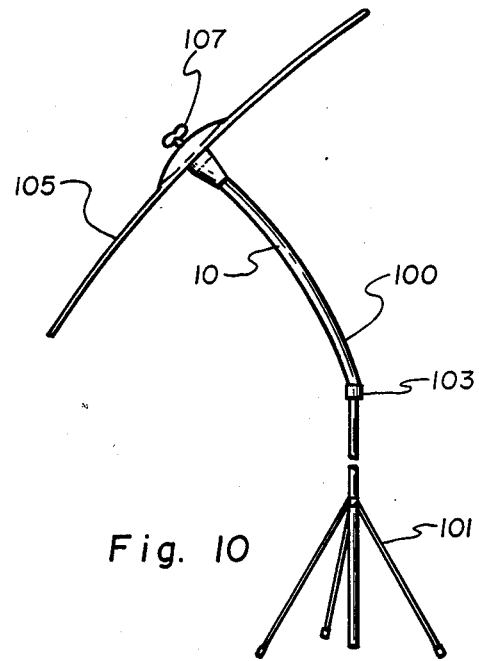
FIG. 10 is an elevated front view of a cymbal stand illustrating a retainer arm of the invention in use as a cymbal support.

FIG. 10 illustrates a retaining arm 100 being mounted to a base stand 101 by a bracket 103. A cymbal 105 is mounted on shaft 10 by a bolt or rod 107 which passes through the cymbal 105 and is threadedly connected with end section 12.

Figure 15:
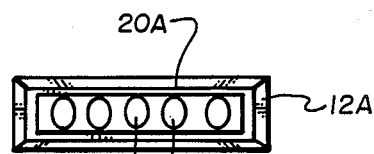
FIG. 15 is a cross-section view of the arm shown in FIG. 14 taken along sectional lines 15—15.
Figure 14:
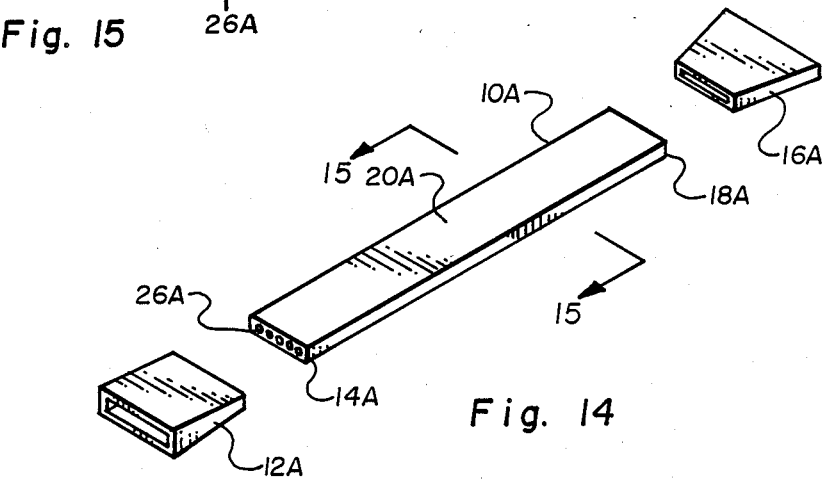
FIG. 14 is an exploded perspective view of a second embodiment of a flexible retainer arm of this invention.

FIGS. 15 and 16 illustrate a modified retainer arm construction wherein the tubular housing 20A is formed as a box-like elongate member having a quadrilateral cross-section. The wire strands 26A are arranged in a linear orientation within the housing 20A; each strand 26A being positioned parallel to those strands 26A positioned adjacent thereto. The end sections 12A and 16A are mounted on the opposing ends 14A and 18A of the housing 20A. Besides the modification of the shape of the housing 20A, and the end sections 12A and 16A, as shown, the basic structure of the arm remains unchanged, i.e. the shaft 10A is formed of manually bendable materials which retain a configuration imparted thereto.

In use, the instant retaining arm has been found to contribute to a clearer musical tone being produced from percussion-type instruments supported thereon as compared to those same instruments being supported by metal or stands of other configurations.

Due to the smooth exterior surface of the retaining arm, the likelihood of a user's hair or clothing becoming entangled or caught in the structure of the arm is markedly reduced, if not totally eliminated as compared with the conventional retaining arm structures.

Those skilled in the art will recognize the embodiment hereinbefore described to be only illustrative of the general principles of the invention. The embodiment herein described is not intended to limit the scope of the claims which themselves recite what the applicant regards as his invention.

I claim:

1. A flexible retainer for use in supporting an object above a base member, said retainer comprising:
   an elongate hollow flexible elastomeric tube defining a channel throughout a length thereof; said tube having a first end and a second end;
   a metal core mounted within said channel, said metal core being sufficiently flexible to be manually bendable into a variety of configurations yet sufficiently rigid to retain a configuration imparted thereto;
   a first housing mounted on said first end, said first housing being adapted to mechanically associate with and retain an object to be supported; said second end being adapted for mounting on said base member; said first housing including:
      a first flexible elongate end segment mounted on sai first end of said tube,
      a second flexible elongate end segment mounted spacedly from said first end segment on said tube proximate said first end,
      a first plurality of flexible annular members coaxially mounted on said tube between said first end segment and said second end segment, said annular members being spacedly mounted from each other along a length of said tube,
      a first plurality of flexible, longitudinally extending bridging support members mounted on said first end segment and said second end segment to extend therebetween, said bridging support members being spacedly positioned from each other about a circumference of said tube, said bridging support members being mounted to said annular members, thereby connecting said annular members to each other,
   wherein said first housing defines a structure adapted to transfer the stress of a load retained by said first end segment incrementally over a region of said tube proximate said first end thereof.

2. The retainer according to claim 1 wherein said metal core is comprised of a plurality of elongate, flexible wires.

3. The retainer according to claim 2 wherein at least two insulated wires are mounted within said channel, said wires being adapted for transmitting electrical current through the said length of said tube.

4. The retainer according to claim 1, said first housing defining a female threaded socket mounted on a first end thereof, said socket being formed of metal and being mounted within said first housing, said first housing including an annular-shaped end region integral with a body of said first housing, adapted to circumscribe and fit over said socket, thereby retaining said socket within said first housing, said annular-shaped end region forming an end of said first housing, said socket being adapted for threaded connection to said object.

5. The retainer according to claim 4 wherein said tube has a second end fitted with a second housing adapted for mechanical association with said base member, said second housing comprising:

a third flexible elongate end segment mounted on said second end of said tube;

a fourth flexible elongate end segment mounted spacedly from said third end segment on said tube proximate said second end;

a second plurality of flexible annular members coaxially mounted on said tube between said third end segment and said fourth end segment, said annular members being spacedly mounted from each other along a length of said tube;

a second plurality of flexible, longitudinally extending bridging support member mounted on said third end segment and said fourth end segment to extend therebetween, said bridging support members being spacedly positioned form each other about said circumference of said tube, said bridging support members being mounted to said second plurality of annular members, thereby connecting said second plurality of annular members to each other;

wherein said second housing defines a structure adapted to transfer the stress of a load retained by said third end segment incrementally over a region of said tube proximate said second end thereof.

6. The retainer according to claim 5 wherein said second housing includes an outwardly extending threaded male extension.

7. The retainer according to claim 3 wherein three insulated wires, adapted for transmitting electrical current, are mounted within said core.

* * * * *

UNITED STATES PATENT OFFICE
CERTIFICATE OF CORRECTION

Patent No. 4,889,303         Dated December 26, 1989

Inventor(s) Mitchell E. Wolf

It is certified that error appears in the above-identified patent and that said Letters Patent is hereby corrected as shown below:

In column 2, line 42, after "section. " insert therefor --This--.
In column 2, line 42, delete "Structure" and insert therefore structure--.
In column 2, line 43, delete "like" and insert therefore --ring-like--.
In column 6, line 48, delete "sai" and insert therefor --said--.

Signed and Sealed this

Second Day of July, 1991

Attest:

HARRY F. MANBECK, JR.

Attesting Officer       Commissioner of Patents and Trademarks